H. E. DECKEBACH.
LIQUID PURIFIER AND SEPARATOR.
APPLICATION FILED JUNE 14, 1906.
921,811.
Patented May 18, 1909.
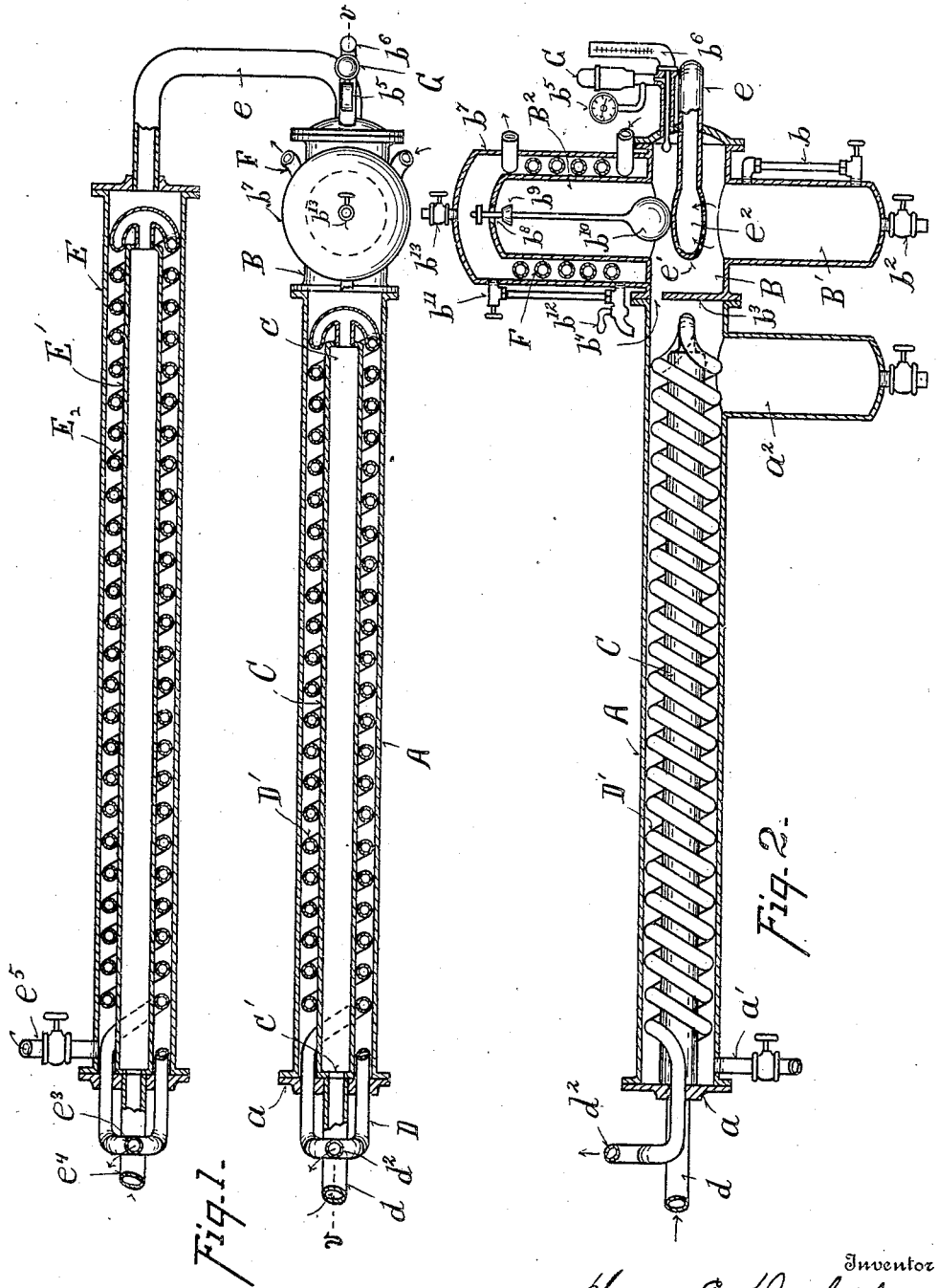
Witnesses
C. W. Miles
A. McCormack
Inventor
Henry E. Deckebach
By Walker F. Murray
Attorney

UNITED STATES PATENT OFFICE.

HENRY E. DECKEBACH, OF CINCINNATI, OHIO.

LIQUID PURIFIER AND SEPARATOR.

No. 921,811.      Specification of Letters Patent.      Patented May 18, 1909.

Application filed June 14, 1906. Serial No. 321,592.

*To all whom it may concern:*

Be it known that I, HENRY E. DECKEBACH, a citizen of the United States of America, and resident of Cincinnati, county of Hamilton, State of Ohio, have invented certain new and useful Improvements in Liquid Purifiers and Separators, of which the following is a specification.

The object of my invention is a means of separating a liquid which holds various substances in solution and suspension, from such substances, as for instance, separating water which may hold certain salts and chemicals obtained from the decomposition of vegetable matter, into a pure water and its various substances. I accomplish this by vaporizing the liquid, conveying the vapors to a chamber and in then drawing off the light vapors from the upper part of the chamber, the medium vapors from a central point, and the heavier substances from the bottom. For instance, in the case of water taken from a stream, I have found that when vaporized, and the vapors were carried into my apparatus, that ammonia and other chemicals formed by the decomposition of vegetable substances, will go to the top of the chamber, the heavier substances to the bottom, and the aqueous vapors will occur at an intermediate point at which the aqueous vapors are drawn off to a condenser. The lighter vapors are conveyed from the top of the chamber to a condenser. The heavier substances accumulate in the bottom of the chamber.

In the accompanying drawings I have shown an apparatus especially adapted for purifying water.

Figure 1 is a view in horizontal section of the heater for water to be purified, of the condenser for the purified aqueous vapors, and in plan view of the vapor chamber. Fig. 2 is a vertical sectional view taken upon line $v$—$v$ of Fig. 1.

Referring to the parts: The vaporizer for converting the fluid to be treated into vapors consists of an exterior cylindrical shell, A, closed at one end by a cap, $a$, and communicating at the other end with a vapor chamber. Within shell, A, is an interior shell, C. A doubled pipe, D, enters the jacket between shells, A and C, through the cap, $a$, and is wound in a double coil, D', around the shell, C, both of the branch pipes entering the end, $c$, of the inner shell, C. The opposite end, $c'$, of the shell, C, communicates with a steam pipe, $d$. Steam is to enter the shell, C, through pipe, $d$, passing thence down through shell, C, to the end, $c$, and thence out into the double coils, D', and thence through the coils to exit pipe, $d^2$, of the coils. The water to be treated enters the shell, A, through the pipe, $a'$. At the end of the shell, A, adjacent to the vapor chamber a mud chamber, $a^2$, is located upon the underside of the shell, A. The water entering the shell, A, by the pipe, $a'$, by the time it has reached the end of the chamber, A, adjacent the vapor chamber, has been converted into vapors by the steam in the pipes, D', and the inner shell, C.

The vapor chamber consists of a central chamber, B, a lower chamber, B', and an upper chamber, B². The lower chamber, B', has secured upon its side a gage, $b$, and upon its lower end a discharge valve $b^2$. The central chamber, B, is in alinement with the cylindrical shell, A, and has between it and the interior of said shell a partition $b^3$, which leaves an opening, $b^4$, above it for the passage of the vapors from the shell, A, into the vapor chamber, B. From the central chamber, B, an exit pipe, $e$, leads into the outer shell, E, of the cooler. Pipe, $e$, within the central chamber, B, terminates in a casing, $e'$, closed upon all sides except the bottom, which has a series of perforations, $e^2$, in it. The central chamber, B, is likewise supplied with a pressure gage, $b^5$, and a thermometer, $b^6$, and a safety valve, G.

The upper, or ammonia chamber, B², is surrounded by an external casing, $b^7$, leaving between it and the chamber, B², a jacket, within which is located a cooling coil, F. The upper end of the chamber, B², is perforated to form a valve seat, $b^8$, to seat the valve, $b^9$, whose valve-stem is provided at its lower end with a float, $b^{10}$, which in the open position of the valve, $b^9$, rests upon the shell, $e'$. Shell, $b^7$, is provided with a gage, $b^{11}$, a faucet, $b^{12}$, and a discharge valve, $b^{13}$.

Within the shell, E, of the cooler is a central shell, E', surrounded by a double coil of pipe, E², similar in construction to the coil, D, for receiving cool water at the pipe, $e^4$, which passes down the shell, E', to the coil, E², and thence out through the discharge pipe, $e^3$. The cooler is provided upon its side with a discharge pipe, $e^5$, for drawing off the condensed vapor.

The operation of the device when used for manufacturing distilled water, is as follows:

The water holding the impurities in solution and in suspension enters heater, A, through pipe, $a'$. Steam enters pipe, $d$. Before the water entering by pipe, $a'$, reaches the diaphragm, $b^3$, it has been vaporized. Mud will accumulate in the chamber, $a^2$. The vapors pass over the diaphragm, $b^3$, through the opening, $b^4$, into central chamber, B. In this chamber the vapors will separate the heavier substances such as calcium sulfate falling into the lower chamber, $B'$, the lighter ones passing up into chamber, $B^2$, and those medium in specific gravity will pass through the perforations, $e^2$, into the pipe, $e$, and thence into the outer shell, E, of the cooler, where the vapors will be condensed by coming into contact with the cooling pipe, $E^2$, and cooling chamber, $E'$, and may be thence drawn off through the pipe, $e^5$. I have found by experiment that the aqueous vapors are medium in weight and that the water drawn off through pipe, $e^5$, will be pure distilled water suitable for use where it is desired to have pure water, such as is used in chemical processes. The vapors arising into chamber, $B^2$, will pass through the perforations, $b^8$, into the cooling jacket, where they are cooled by the pipe, F, and may thence be drawn off through faucet, $b^{12}$.

I have found that the liquid drawn off through pipe $b^{12}$, is comparatively strong in ammonia when ordinary surface water is used, such as is taken from streams. Should liquid from any cause accumulate in chamber, B, it will raise the float, $b^{10}$, and prevent the liquid passing into the jacket between the shells, $B^2$ and $b^7$.

What I claim is:

1. In a liquid purifier the combination of a heater, a vapor chamber for aqueous vapors, an upper chamber in communication therewith for ammonia vapors, the aqueous chamber having an exit pipe leading into it, the end of which is closed by a casing having perforations in its bottom, a cooler in communication with said exit pipe, a cooling jacket surrounding the ammonia chamber, a communication between the ammonia chamber and the cooling jacket and a valve for regulating the opening between the ammonia chamber and its cooling jacket.

2. In a liquid purifier the combination of a heater consisting of a horizontal shell, a heating coil entering the shell at one end, a vapor chamber at the opposite end, a diaphragm between the vapor chamber and the heater leaving an opening above the diaphragm for the passage of the vapors into the vapor chamber from the heater, a mud chamber in the heater adjacent to the diaphragm, the vapor chamber consisting of a central chamber for aqueous vapors, an upper chamber for ammonia vapors, and a lower chamber for heavier mineral products, a cooler, an exit pipe leading from the aqueous chamber into the cooler, and a condenser surrounding the ammonia chamber and in communication with the ammonia chamber.

HENRY E. DECKEBACH.

Witnesses:
WALTER F. MURRAY,
AGNES McCORMACK.